J. STROWAY.
LIFTER.
APPLICATION FILED OCT. 28, 1914.
1,179,976.
Patented Apr. 18, 1916.
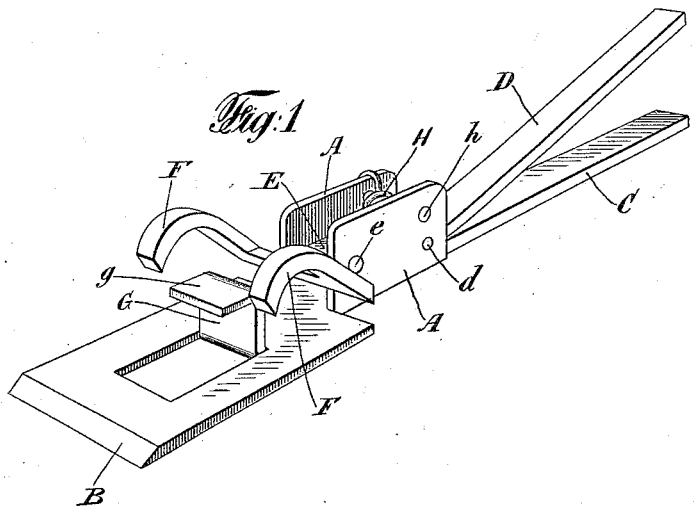
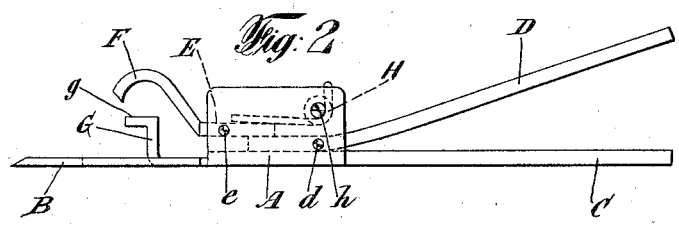
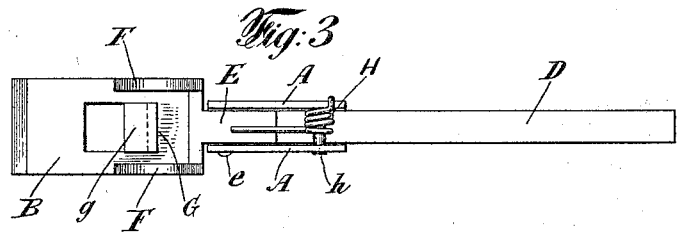
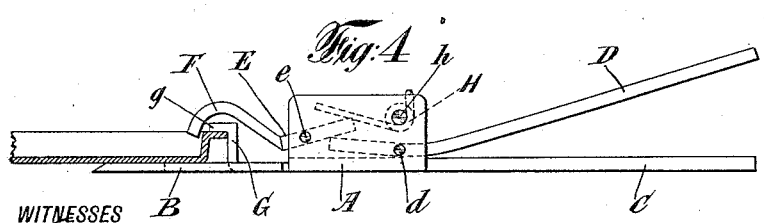
WITNESSES
INVENTOR
John Stroway
BY
Kenyon & Kenyon
ATTORNEYS

UNITED STATES PATENT OFFICE.

JOHN STROWAY, OF NEW YORK, N. Y.

LIFTER.

1,179,976.

Specification of Letters Patent.  Patented Apr. 18, 1916.

Application filed October 28, 1914. Serial No. 868,948.

*To all whom it may concern:*

Be it known that I, JOHN STROWAY, a citizen of the United States, and a resident of New York city, in the county and State of New York, have invented certain new and useful Improvements in Lifters, of which the following is a specification.

My invention relates to improvements in lifters for handling plates, dishes and culinary articles in general, so that the same will not come in contact with the hands of the person using my improved implement. It is also very useful for the handling of hot utensils.

It has for one of its objects to provide a simple, durable and inexpensive kitchen utensil for the above purposes, one that it is practically impossible to get out of order, and yet capable of taking so firm a grip on the article to be lifted that it can be absolutely relied on to keep the article from slipping. When used for lifting hot dishes from ovens or elsewhere its object is to prevent the burning of the hands of the user.

Another object of the invention is to lift and carry dishes of all kinds from the kitchen to the dining table where they are to be served, thus making it unnecessary for the dishes to come in contact with the hands of the server.

Still another object which it has in view is to enable the user to lift soiled dishes waiting to be cleansed, and place them in the prepared hot water, and by proper manipulation, and without removing them from the clutch of the lifter, to cleanse them much more quickly than could be done in any other way.

These objects I accomplish by the means hereinafter set forth and clearly illustrated in the accompanying drawings forming part hereof, in which similar letters of reference indicate similar parts.

Figure 1 is a perspective view of my invention. Fig. 2 is a side view thereof. Fig. 3 is a top view of the device, and Fig. 4 shows the invention in use.

Referring to the drawings, it will be seen that my invention consists of a bottom plate with a broad or lifter end B, and a narrow or handle end C; walls or uprights A A rising from either side of said plate near the middle thereof; two levers D and E mounted between said uprights A A on pivots d and e, respectively, the lever E at its forward or outer end being formed into two curved tines or prongs F F; a spring H pivoted at h, and an abutment or post G provided with a forwardly extending arm or projection g.

The uprights or walls A A are preferably made integral with the bottom plate, as is also the post or abutment G. The abutment G is placed at such a distance between the front end B of the bottom plate, and the uprights A A, that the curved ends or tines F of the lever E when depressed by the operation of the handle D, will grip the dish, or other article on the plate, and press it firmly against the post or abutment G. The tines F of lever E are preferably curved in the way shown so that they will tend to move the utensil to be lifted toward the abutment G. The object of the spring H is to hold the levers in their normal open position, that is to say, with the prongs F away from the abutment G, the adjoining ends of levers D and E being then parallel with each other.

The operation of the device is as follows. The front or lifter end B of the bottom plate is placed under the dish, plate, or other culinary article to be lifted and served, or removed from an oven, or the top of a stove; the handle end of lever D is depressed, which, raising the inner end of lever E against the action of spring H, causes the outer curved or hooked ends of said lever to descend and contact with or grip the edge of the dish, plate, or other culinary article on the lifter, and press it firmly against the post G; the handles D and C are then clasped by the user, the device lifted, and the article deposited wherever it is to go by simply holding the implement on a slight decline, and releasing the handle D, whereupon the tension of the spring H will restore said handle to its normal position, at the same time causing the prongs F to release their grip and assume their position when not in use, that is, away from the bottom plate.

A great advantage of my invention is the abutment G. This element makes it unnecessary for the user to exercise any judgment in placing the article to be raised at any particular point on the lifter. The user will see at once that as long as the article contacts with, or is close to the said abutment, the descending curved or tined lever is certain to grasp it; and while there is practically no likelihood of the article ever slipping when once grasped, should this occur the arm or projection at the top of the abutment would prevent any further mishap, such, for instance, as the dish falling from the lifter.

My invention can be made of either wood or metal, but I prefer to make it of metal for obvious reasons.

It is evident that many changes may be made in my invention without departing from the spirit thereof. For instance, the levers could be made removable, and if, for any reason, it should become desirable, the pivoted ends of the levers, and the spring, could be entirely boxed or housed in. In such a case it would be desirable to make the cover of said housing or box removable, so that the inclosed parts could be readily cleaned. The abutment could also be made straight or curved at will, and of any width.

What I claim as new and desire to secure by Letters Patent, is:

1. The combination with a bottom plate consisting of a broad lifter end and a narrow handle end, and walls or uprights about midway thereof between which two levers are mounted whose inner ends contact with each other, of an abutment or post with a forwardly projecting top on said lifter end, the forward lever curved over and downwardly in front of said abutment, so that when the handle lever is depressed it causes the forward lever to descend in front of said fixed abutment and press the article to be lifted firmly against and below the projecting top of same, substantially as described.

2. The combination with a bottom plate consisting of a lifter end and a handle end, supporting means intermediate the ends thereof on which are mounted two levers whose inner ends contact with each other, and a spring fixedly attached to said supporting means and having one end pressing downward on the rear end of the forward lever, of an abutment or post with a forwardly projecting top on said lifter end, the forward lever curved over and downwardly in front of said abutment, so that when the handle lever is depressed it causes the forward lever to descend in front of said fixed abutment and press the article to be lifted firmly against and below the projecting top of same, substantially as described.

In testimony whereof, I have signed my name to this specification, in the presence of two subscribing witnesses.

JOHN STROWAY.

Witnesses:
   T. E. RAFTERY,
   EDWIN SEGER.

Copies of this patent may be obtained for five cents each, by addressing the "Commissioner of Patents Washington, D. C."